United States Patent
Shih et al.

(10) Patent No.: US 7,987,312 B2
(45) Date of Patent: Jul. 26, 2011

(54) METHOD AND APPARATUS FOR DYNAMICALLY DETERMINING BIT CONFIGURATION

(75) Inventors: Robert Shih, Taipei (TW); Jing-Rung Wang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1907 days.

(21) Appl. No.: 10/903,359

(22) Filed: Jul. 30, 2004

(65) Prior Publication Data

US 2006/0026320 A1    Feb. 2, 2006

(51) Int. Cl.
*G06F 13/36* (2006.01)
(52) U.S. Cl. .......................... 710/311; 713/1
(58) Field of Classification Search .......... 710/305–306, 710/311–314, 316, 8–10, 301–302; 713/1; 709/220
See application file for complete search history.

(56) References Cited

U.S. PATENT DOCUMENTS

| 7,457,897 | B1 * | 11/2008 | Lee et al. | 710/74 |
| 2005/0160214 | A1 * | 7/2005 | Sauber et al. | 710/315 |
| 2005/0262391 | A1 * | 11/2005 | Sethi et al. | 714/9 |

FOREIGN PATENT DOCUMENTS

CN    1085864    5/2002

OTHER PUBLICATIONS

China Office Action mailed Sep. 29, 2006.

\* cited by examiner

*Primary Examiner* — Clifford Knoll
(74) *Attorney, Agent, or Firm* — Thomas|Kayden

(57) ABSTRACT

A method for dynamically determining bit configuration for a host bridge. The method first obtains information of peripheral components coupled to the host bridge. Next, the method dynamically determines a bit configuration of a processor system bus connecting to the host bridge according to the obtained information.

20 Claims, 3 Drawing Sheets

METHOD AND APPARATUS FOR DYNAMICALLY DETERMINING BIT CONFIGURATION

BACKGROUND

The present invention relates to bit configuration of a bus, and in particular to methods and apparatuses for dynamically determining bit configuration for a host bridge.

Peripheral Component Interconnect (PCI) Express bus is an interconnection system between a microprocessor and attached devices. The PCI Express bus serves as a standard architecture for system bus. Presently, microprocessors and attached devices demand higher bandwidth system buses to support both frequency and voltage requirements. Due to PCI Express bus support for both frequency and voltage requirements, PCI Express bus will play a major role in the foreseeable future.

PCI Express bus utilizes flat memory address mapping to access device configuration registers, that is, the memory address determines the bit configuration of the system bus for a host bridge. According to the specifications for PCI Express bus, for example PCI Express Base specification rev. 1.0, PCI 2.3 Compatible Configuration Mechanism, or PCI Express Enhanced Configuration Mechanism, the bit configuration is defined as shown in Table 1. In table 1, "A" represents memory address.

TABLE 1

| Memory Address | PCI Express bit configuration |
| --- | --- |
| A[20]-A[27] | Bus number field |
| A[15]-A[19] | Device number field |
| A[12]-A[14] | Function number field |
| A[8]-A[11] | Extended register number field |
| A[2]-A[7] | Register number field |
| A[0]-A[1] | Along with size of the access, used to generate byte enables |

As shown in Table 1, from A[0] to A[27], a PCI Express bus requires a 256 MB ($2^{28}$ megabyte) based memory address allocation. Thus, a system may implement at least 28 pins for PCI Express bus architecture. Some systems, such as mini or closed systems, may adopt PCI Express bus as system architecture without providing as many pins.

Additionally, as previously mentioned, PCI Express bus adopts a 256 MB based memory address allocation. The limitation of memory address allocation may cause memory allocation fragments. Some systems, such as Root Complex systems or multi-Root Complex systems, may release the limitation of memory address allocation for system efficiency. However, present methods and systems cannot resolve previously mentioned problems.

SUMMARY

Accordingly, an embodiment of the invention determines bit configuration dynamically for a host bridge. Information of peripheral components coupled to a host bridge is first obtained. Bit configuration of a system bus connecting to the host bridge is then determined according to the obtained information.

BRIEF DESCRIPTION OF THE DRAWINGS

The present invention can be more fully understood by reading the subsequent detailed description and examples with references made to the accompanying drawings, wherein.

DETAILED DESCRIPTION

Figure 1:
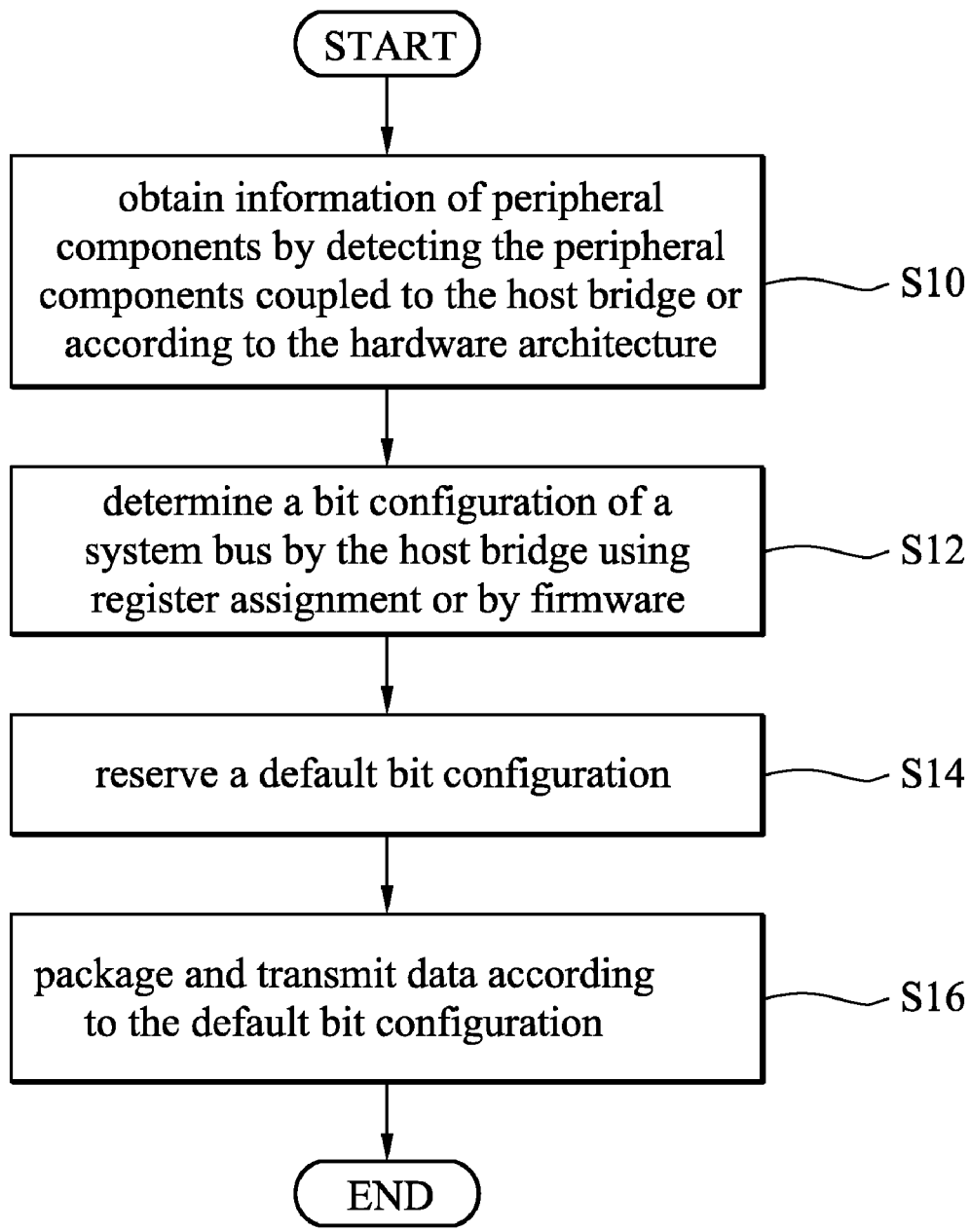
FIG. 1 is a flowchart of a method for dynamically determining bit configuration for a host bridge according to an embodiment of the invention.

FIG. 1 is a flowchart of a method for dynamically determining bit configuration for a host bridge according to an embodiment of the invention. Information of peripheral components coupled to a host bridge is first obtained (step S10). The information may be obtained by detecting the peripheral components coupled to the host bridge or simply obtained by the hardware architecture of a system.

Next, a bit configuration of a system bus connecting to the host bridge is determined according to the obtained information (step S12). The system bus can be a Peripheral Component Interconnect Express bus connecting to a central processing unit and the host bridge. A default bit configuration may be reserved for the host bridge (step S14), thus, the host bridge will package and transmit data according to the default bit configuration thereafter (step S16).

The bit configuration may comprise a bus number field, a device number field, and a function number field. Referring to step S12, the determination of the bit configuration may be accomplished by designating bit numbers of the bus number field, the device number field, and the function number field.

The bit number designation may be accomplished by the host bridge using register assignment or by firmware implemented in a chip coupled to the host bridge.

Table 2 shows the bit number designation of a PCI Express bus according to the inventive method. In table 2, represents memory address.

TABLE 2

| Memory Address | PCI Express bit configuration |
| --- | --- |
| A[12+x+y]-A[12+x+y+z-1] | Bus number field |
| A[12+x]-A[12+x+y-1] | Device number field |
| A[12]-A[12+x-1] | Function number field |
| A[8]-A[11] | Extended register number field |
| A[2]-A[7] | Register number field |
| A[0]-A[1] | Along with size of the access, used to generate byte enables |

As shown in Table 2, the function number field is assigned as x bits, such that the mapping memory address thereof becomes A[12]-A[12+x-1], wherein $1 \leq x \leq 3$, limited by the default PCI Express bus configuration. Similarly, the device number field can be assigned as y bits, wherein $1 \leq y \leq 5$, and the bus number field, z bits, $1 \leq z \leq 8$. Thus, a system having only 14 pins can adopt a PCI Express bus as system architecture.

The memory allocation is also changed accordingly. For example, if the function number field, the device number field, and the function number field are assigned as 1 bit individually, the host bridge then uses 16 MB ($2^{14}$ megabytes), A[0]-A[14], as memory allocation base, releasing the limitation of the original memory allocation base, 256 MB.

Figure 2:
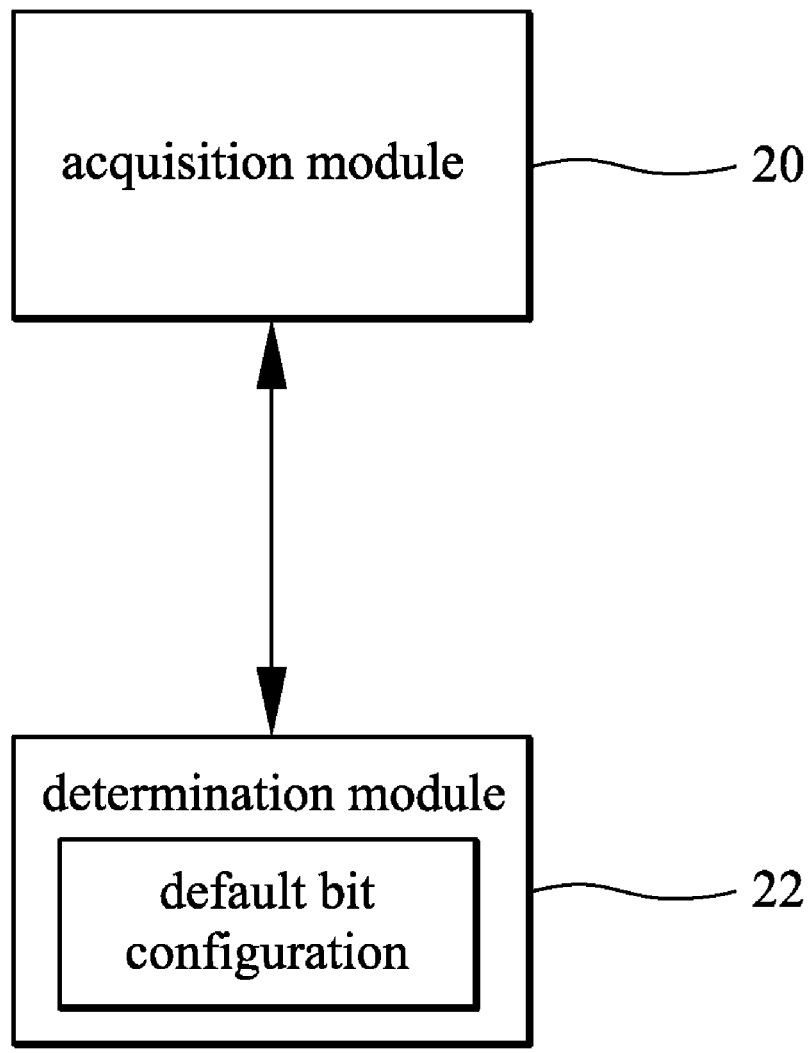
FIG. 2 is a diagram of an apparatus for dynamically determining bit configuration for a host bridge according to an embodiment of the invention.

FIG. 2 is a diagram of an apparatus for dynamically determining bit configuration for a host bridge, comprising an acquisition module 20 and a determination module 22.

The acquisition module 20 obtains information of peripheral components coupled to the host bridge. The acquisition module 20 may obtain the information by detecting the peripheral components coupled to the host bridge or according to the hardware architecture.

The determination module 22, coupled to the acquisition module 20, determines a bit configuration of a system bus connecting to the host bridge according to the obtained information. Here, the system bus is a Peripheral Component Interconnect Express bus connecting to a central processing unit and the host bridge.

Bit configuration comprises a bus number field, a device number field, and a function number field. The determination module 22 designates bit numbers of the bus number field, the device number field, and the function number field to accomplish determination of the bit configuration. If the determination module 22 is implemented in the host bridge, the bit number designation may be accomplished by the host bridge using register assignment. If the determination module 22 is implemented in firmware, such as a chip coupled to the host bridge, the bit number designation may be accomplished thereby.

The determination module 22 further reserves a default bit configuration for the host bridge. The host bridge can then package and transmit data according to the default bit configuration.

Figure 3:
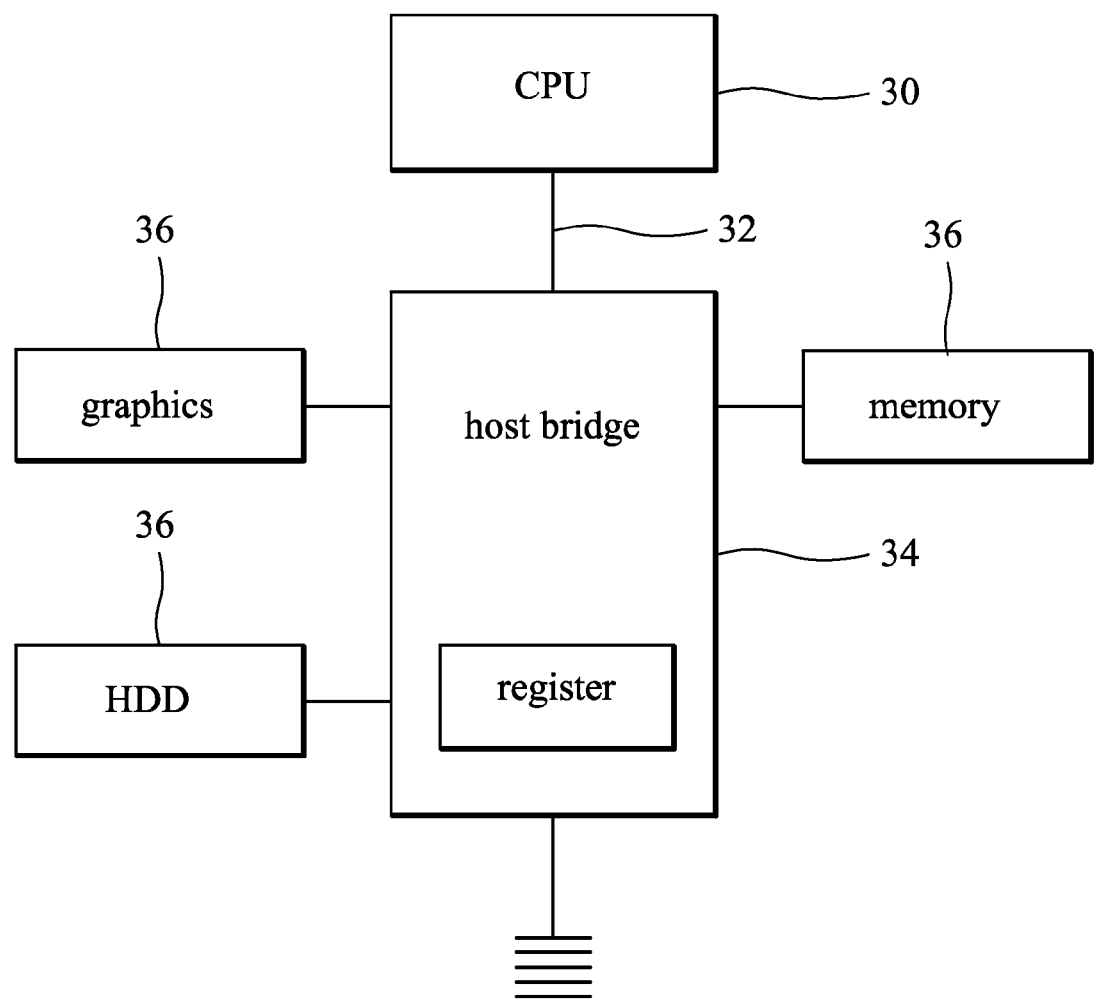
FIG. 3 is a diagram showing practical application of the method for dynamically determining bit configuration for a host bridge.

FIG. 3 is a diagram showing practical application of the method for dynamically determining bit configuration for a host bridge, in which, the system bus 32 is a Peripheral Component Interconnect Express bus connecting to a central processing unit (CPU) 30 and a host bridge 34. The acquisition module 20 and the determination module 22 are implemented in the host bridge 34. The acquisition module 20 obtains the information peripheral components 36 coupled to the host bridge 34 according to the hardware architecture.

Next, bit configuration of a system bus 32 connecting to the host bridge 34 is determined according to the obtained information. The determination module 22 reserves a default bit configuration for the host bridge 34 and the host bridge 34 packages and transmits data according to the default bit configuration.

The bit configuration may comprise a bus number field, a device number field, and a function number field. The determination of the bit configuration may be accomplished by designating bit numbers of the bus number field, the device number field, and the function number field. The bit number designation is accomplished by the host bridge 34 using register assignment. If the acquisition and determination modules are not implemented in the host bridge 34, but in firmware coupled to the host bridge 34, bit number designation can be accomplished thereby.

An embodiment of method and apparatus for dynamically determining bit configuration for a host bridge are provided, may improve determination of the bit configuration and memory allocation problems for a host bridge, presenting significant advantages to PCI Express bus architecture.

While the invention has been described by way of example and in terms of preferred embodiment, it is to be understood that the invention is not limited thereto. To the contrary, it is intended to cover various modifications and similar arrangements (as would be apparent to those skilled in the accorded the broadest interpretation so as to encompass all such modifications and similar arrangements.

What is claimed is:

1. A method for dynamically determining bit configuration for a host bridge, comprising:
    obtaining information of peripheral components coupled to the host bridge; and
    dynamically determining bit configuration of a system bus connecting to the host bridge and then designating a bit number according to the obtained information of the peripheral components and the dynamically-determining bit configuration of the system bus, wherein the bit number is positive integer in a specific range.

2. The method for dynamically determining bit configuration for a host bridge as claimed in claim 1, wherein the system bus is a Peripheral Component Interconnect Express bus connecting to a central processing unit and the host bridge.

3. The method for dynamically determining bit configuration for a host bridge as claimed in claim 1, wherein the bit configuration comprises a bus number field, a device number field, and a function number field.

4. The method for dynamically determining bit configuration for a host bridge as claimed in claim 3, wherein the designating bit number comprises designating bit numbers of the bus number field, the device number field, and the function number field.

5. The method for dynamically determining bit configuration for a host bridge as claimed in claim 4, wherein the bit number designation is accomplished by the host bridge using register assignment or by firmware.

6. The method for dynamically determining bit configuration for a host bridge as claimed in claim 4, wherein the specific range of the bit number of the function number field is from 1 to 3; the specific range of the bit number of the device number field is from 1 to 5; the specific range of the bit number of the bus number field is from 1 to 8.

7. The method for dynamically determining bit configuration for a host bridge as claimed in claim 5, wherein the firmware is implemented in a chip coupled to the host bridge.

8. The method for dynamically determining bit configuration for a host bridge as claimed in claim 1, wherein the method further detects the peripheral components coupled to the host bridge to obtain the information.

9. The method for dynamically determining bit configuration for a host bridge as claimed in claim 1, wherein the method further reserves a default bit configuration for the host bridge.

10. The method for dynamically determining bit configuration for a host bridge as claimed in claim 9, wherein the method further packages and transmits data according to the default bit configuration.

11. An apparatus for determining bit configuration dynamically for a host bridge, comprising:
    an acquisition module, obtaining information of peripheral components coupled to the host bridge; and
    a determination module, coupled to the acquisition module, dynamically determining a bit configuration of a system bus connecting to the host bridge and then designating a bit number according to the obtained information of the peripheral components and the dynamically-determining bit configuration of the system bus, wherein the bit number is positive integer in a specific range.

12. The apparatus for determining bit configuration dynamically for a host bridge as claimed in claim 11, wherein the system bus is a Peripheral Component Interconnect Express bus connecting to a central processing unit and the host bridge.

13. The apparatus for determining bit configuration dynamically for a host bridge as claimed in claim 11, wherein the bit configuration comprises a bus number field, a device number field, and a function number field.

14. The apparatus for determining bit configuration dynamically for a host bridge as claimed in claim 13, wherein the bit number comprises bit numbers of the bus number field, the device number field, and the function number field to determine the bit configuration.

15. The apparatus for determining bit configuration dynamically for a host bridge as claimed in claim 14, wherein the determination module is implemented in the host bridge and the bit number designation is accomplished by the host bridge using register assignment.

16. The apparatus for determining bit configuration dynamically for a host bridge as claimed in claim 14, wherein the bit number designation is accomplished by firmware.

17. The apparatus for determining bit configuration dynamically for a host bridge as claimed in claim 16, wherein the firmware is implemented in a chip coupled to the host bridge.

18. The apparatus for determining bit configuration dynamically for a host bridge as claimed in claim 11, wherein the acquisition module further detects the peripheral components coupled to the host bridge to obtain the information.

19. The apparatus for determining bit configuration dynamically for a host bridge as claimed in claim 11, wherein the determination module further reserves a default bit configuration for the host bridge.

20. The apparatus for determining bit configuration dynamically for a host bridge as claimed in claim 11, wherein the host bridge further packages and transmits data according to the default bit configuration.

\* \* \* \* \*